Feb. 16, 1965 J. L. PETERSON 3,169,625

COIN CHUTE FOR COIN OPERATED TELEPHONE

Filed Aug. 21, 1962 11 Sheets-Sheet 1

INVENTOR
J. L. PETERSON
BY E J Oliuder
ATTORNEY

Feb. 16, 1965 J. L. PETERSON 3,169,625

COIN CHUTE FOR COIN OPERATED TELEPHONE

Filed Aug. 21, 1962 11 Sheets-Sheet 2

INVENTOR
J. L. PETERSON
BY E. J. Oleuder
ATTORNEY

COIN CHUTE FOR COIN OPERATED TELEPHONE

Filed Aug. 21, 1962 11 Sheets-Sheet 3

INVENTOR
J. L. PETERSON
BY E J Oliuder
ATTORNEY

Feb. 16, 1965 J. L. PETERSON 3,169,625

COIN CHUTE FOR COIN OPERATED TELEPHONE

Filed Aug. 21, 1962 11 Sheets-Sheet 4

INVENTOR
J. L. PETERSON
BY E. J. Olinder
ATTORNEY

INVENTOR
J. L. PETERSON
BY E J Oluder
ATTORNEY

Feb. 16, 1965 J. L. PETERSON 3,169,625

COIN CHUTE FOR COIN OPERATED TELEPHONE

Filed Aug. 21, 1962 11 Sheets-Sheet 6

INVENTOR

J. L. PETERSON

BY E. J. Oliender

ATTORNEY

INVENTOR
J. L. PETERSON
BY E. J. Olender
ATTORNEY

Feb. 16, 1965 J. L. PETERSON 3,169,625

COIN CHUTE FOR COIN OPERATED TELEPHONE

Filed Aug. 21, 1962 11 Sheets-Sheet 8

INVENTOR
J. L. PETERSON
BY E. J. Chuder
ATTORNEY

COIN CHUTE FOR COIN OPERATED TELEPHONE

Filed Aug. 21, 1962 11 Sheets-Sheet 9

INVENTOR
J. L. PETERSON
BY E J Oluder
ATTORNEY

COIN CHUTE FOR COIN OPERATED TELEPHONE

Filed Aug. 21, 1962 11 Sheets-Sheet 10

INVENTOR
J. L. PETERSON
BY E J Olinder
ATTORNEY

INVENTOR
J. L. PETERSON
BY
E J Olunder
ATTORNEY

United States Patent Office 3,169,625
Patented Feb. 16, 1965

3,169,625

COIN CHUTE FOR COIN OPERATED TELEPHONE

Jerry L. Peterson, Arlington, Va., assignor to Bell Telephone Laboratories, Incorporated, New York, N.Y., a corporation of New York Filed Aug. 21, 1962, Ser. No. 218,342
12 Claims. (Cl. 194—44)

This invention relates to coin testing machanisms and its general object is to enhance the reliability and flexibility of such apparatus.

Coin operated apparatus such as vending machines and pay station telephones, for example, typically include a mechanism commonly termed a "coin chute." Broadly, the principal functions of a coin chute include receiving deposited coins, testing received coins to determine whether they are genuine or spurious, collecting the genuine coins and rejecting those which fail to meet the prescribed tests. Coin validity determinations are normally based on various measurements of size, weight, resistivity and magnetic properties.

Coin chutes which employ fully adequate testing means tend to become unduly complex not only because of the difficulty of properly interrelating the various testing functions but also because these functions must generally be performed with respect to coins of different denominations which may include nickels, dimes and quarters, for example. Moreover, in areas of the United States which are close to the Canadian border, the common use of Canadian nickels further complicates the problem since Canadian nickels are magnetic while United States nickels are nonmagnetic, although both are of substantially the same size and weight. A need exists for a reliable yet simple coin chute which may readily be converted to accept both United States and Canadian nickels.

A further problem in the design of coin chutes relates to the specific means employed for clearing out coins which have been retained in the chute for failure to pass one or more of the applied tests. Heretofore, coin chute clear out mechanisms have not been fully satisfactory in that mechanical linkages requiring an undesirably large number of parts with close design tolerances have been employed. Such mechanisms are costly to manufacture, difficult to assemble and subject to jamming and other malfunctions.

Accordingly, a specific object of the invention is to simplify coin chute mechanisms.

Another object is to enhance the flexibility of coin chute mechanisms, rendering them readily convertible to chutes capable of accepting either United States or Canadian nickels.

A further object of the invention is to reduce the number of parts employed in a coin chute.

Still another object is to simplify the assembly and disassembly of coin chute mechanisms and to reduce the cost of manufacture.

Another object of the invention is to increase the accuracy of a coin chute in discriminating between genuine and spurious coins.

A further object of the invention is to reduce the likelihood of coin chute jamming by imperfect coins or slugs.

These and other objects are achieved in accordance with the principles of the invention by a coin chute mechanism comprised basically of a number of substantially parallel plate members which are conveniently affixed to or pivotally mounted on a central or master plate. In accordance with the invention a common coin entry slot for the deposit of all coins is formed between the master plate and a pivotally mounted guide plate. Coin turning is not required since a deposited coin is kept in substantially the same plane as the plane of entry during its travel through the chute. Immediately upon deposit, a coin is subjected to a magnetic test by a removable magnet which is hinge-mounted on the outside of the master plate. Size and weight testing for each of three coin denominations is provided by a respective one of three coin cradles. Each of the cradles has a pair of cradle fingers which extends into the channel formed between the master plate and the guide plate.

The principles of the invention also provide a unique interrelation between the weight testing means and a means for testing the resistivity-density product of each coin. A coin of sufficient weight and proper size to be held by the fingers of its respective coin cradle tips the cradle and rolls onto a respective one of three coin ramps or runs. The runs are perpendicular to the plane of the guide and master plates and are integral with a run plate which is pivotally mounted on the master plate. As a coin rolls down its run, it is also guided by a channel formed between the master plate and a magnet plate which is mounted substantially flush with the guide plate. Mounted in the magnet plate and flush with the inner or guiding surface thereof are two eddy current magnets, one for testing quarters and one for testing dimes.

As a coin rolls past its respective eddy current magnet, a current is induced in the coin which current is a function of the resistivity and density of the coin. Further, the velocity of the coin as it leaves the eddy current test area is a direct function of the induced current. The velocity of the coin determines its trajectory and the trajectory in turn determines whether the coin is directed to a coin return area or to a coin collection area.

The principles of the invention call for closely similar handling insofar as the testing of quarters and dimes is concerned. In the case of nickels, however, the path of coin travel is changed substantially. As soon as a nickel is released from its rotated cradle, it impinges upon a deflecting lip which protrudes into the channel between the magnet plate and the master plate. The lip deflects the nickel through an aperture to the opposite side of the master plate where it is then guided by a channel formed between the master plate and a nickel cover plate. The nickel cover plate also provides a means for positioning a nickel eddy current magnet. In accordance with the invention it is only after a nickel deposit has been diverted to the opposite side of the master plate, that an eddy current test is applied. The velocity or trajectory of the nickel as it leaves the eddy current test area determines whether the nickel is eventually collected or returned to the customer.

The unique nickel testing path which is afforded by a coin chute in accordance with the invention, renders it readily convertible to a chute that will accept both United States nonmagnetic nickels and Canadian nickels. The conversion may be effected simply by interchanging the nickel cover plate described with a nickel cover plate which includes no eddy current magnet. Additionally, the reject magnet mounted on the master plate in the coin entryway is also removed. Thus, in the case of a chute in accordance with the invention which has been adapted to receive both Canadian and United States nickels, nickels are tested for size and weight but not for magnetic properties.

Coins may be retained in the chute after deposit as a result of coin deformation or as the result of failure to pass one of the size, weight or magnetic material tests. In accordance with the invention a unique multifunction clear out means is provided which ensures the release of all coins irrespective of the reason for their detention. A single thrust of a customer-operated linkage is translated to initiate a complete withdrawal of both the coin runs and the coin cradle fingers from the coin channel between the master plate and the guide plate. The same linkage operates each of two clear out arms which sweep the eddy current magnet areas clear on both sides of the master plate. Additionally, the same action pivots the guide plate away from the master plate, thus enlarging the entire coin channel area between the master plate and the guide plate. Pivotal movement of the guide plate is in turn translated into a pivoting force which swings the reject magnet clear of the master plate.

Accordingly, one feature of the invention is a coin chute mechanism which may be readily converted to accept both United States and Canadian nickels by the simple interchange of a single part.

Another feature of the invention is a coin chute mechanism in which the bulk of the auxiliary plate members are pivotally mounted on a central or master plate member.

A further feature of the invention is a coin chute mechanism in which coins are tested and processed in the same plane as the plane of the coin at the time of deposit.

Still another feature of the invention is a coin chute mechanism in which eddy current testing means for quarters and dimes are completely isolated from eddy current testing means for nickels.

The invention, together with additional objects and features thereof, will be fully apprehended from a consideration of the following detailed description of an illustrative embodiment and from the appended drawing, in which.

*Construction*

Figure 1:
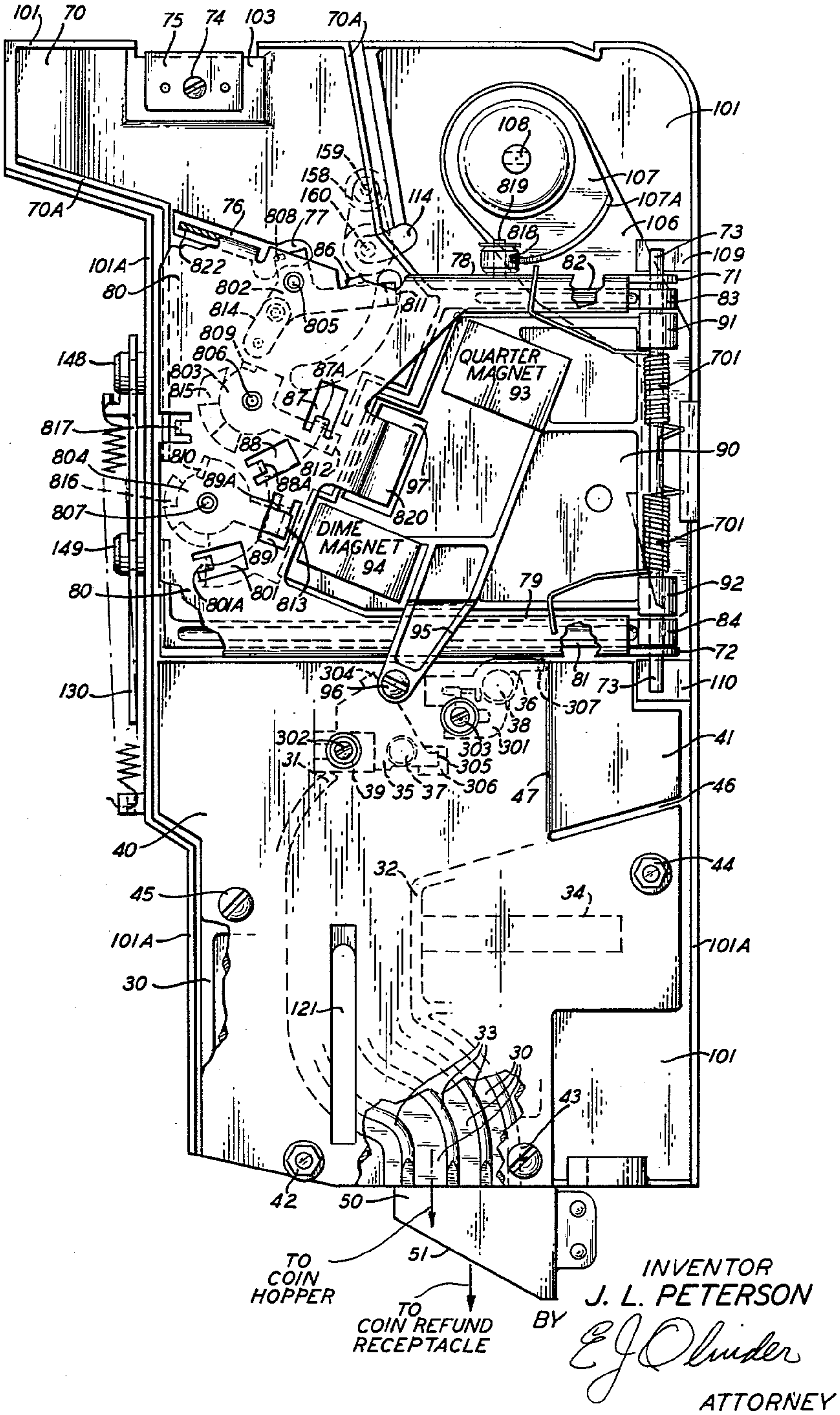
FIG. 1 is a right side view in elevation of a coin chute in accordance with the invention.
Figure 2:
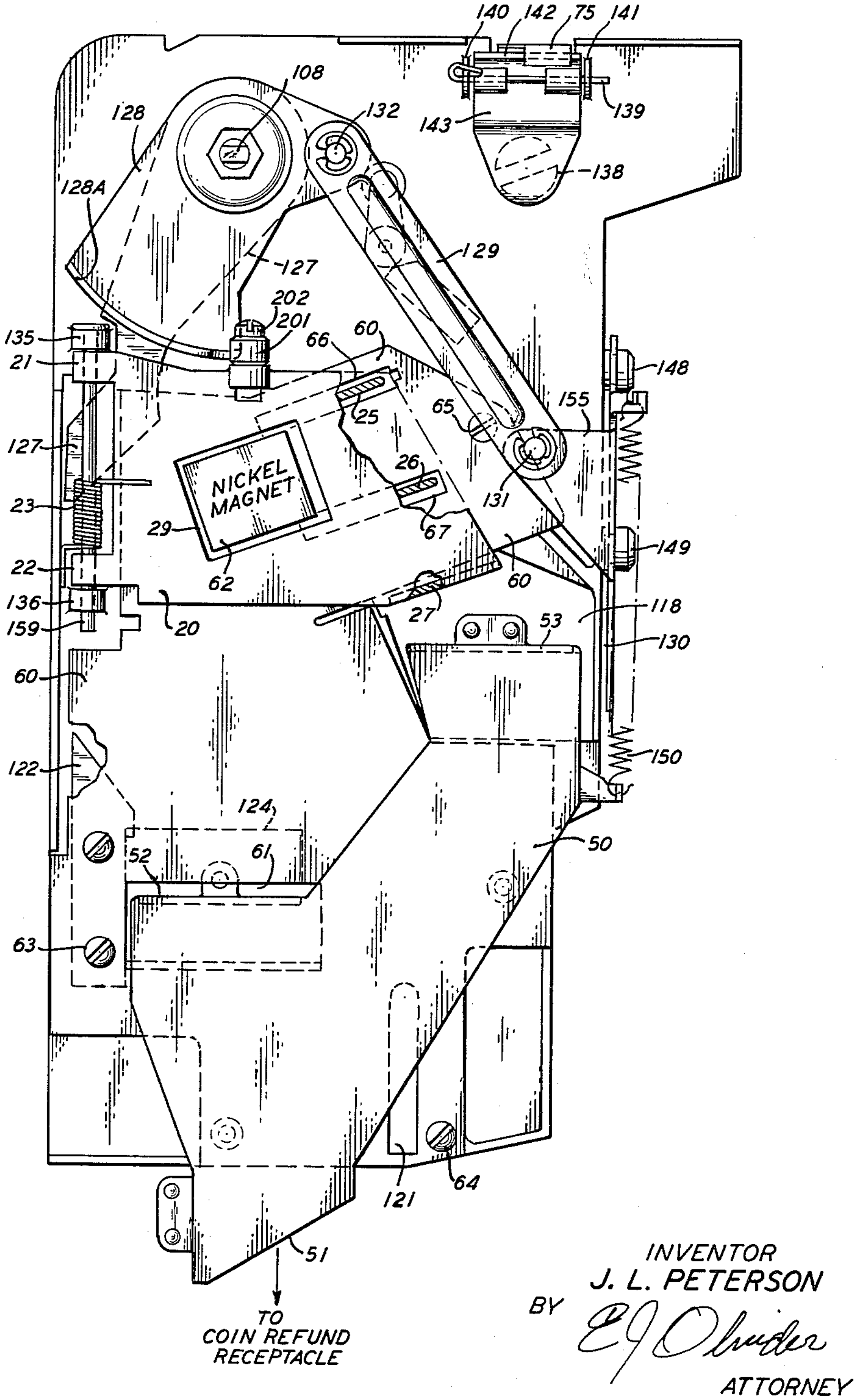
FIG. 2 is a left side view in elevation.
Figures 3, 4, 5:
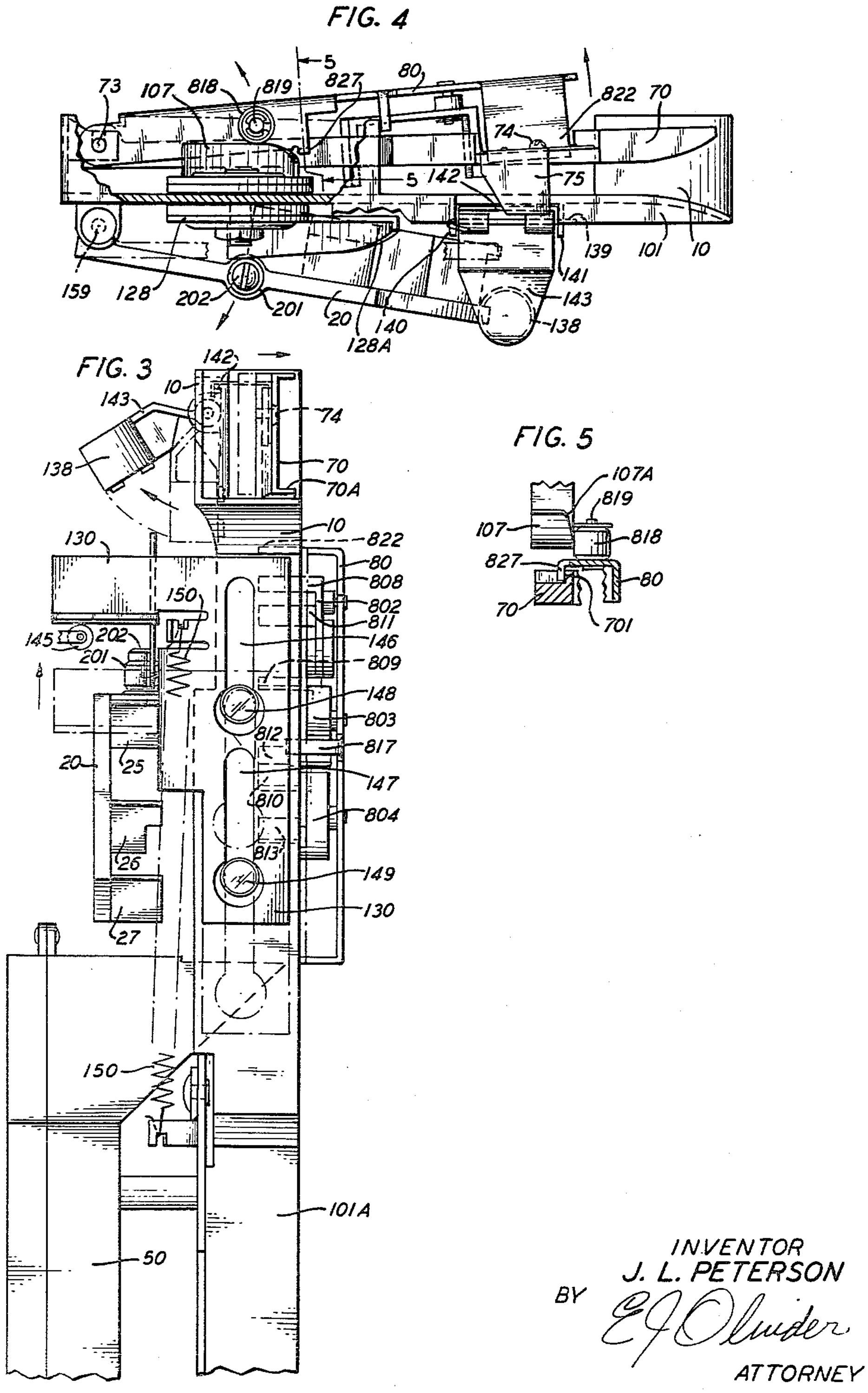
FIG. 3 is a front view in the operated or clear out condition.
FIG. 4 is a top view of FIG. 3.
FIG. 5 is a fragmentary view of FIG. 4, taken along the line 5—5.

Broadly, the construction of a coin chute in accordance with the invention calls for a plurality of substantially parallel mounted plate members. Certain of the plate members form channels or passageways through which deposited coins are guided. Other plates carry additional guiding means or testing means which are inserted into the various coin passageways. With reference now to FIGS. 1 and 2, master plate 101 forms a base member to which all other plate members are affixed. In FIG. 1 master plate 101, except for its outer contour, is substantially hidden from view by other superimposed plates. The left edge, right edge and a portion of the top edge of the right side of master plate 101 form a protruding lip member 101A, also shown in FIG. 3. Lip 101A terminates in a curved flange-like section 10 which serves as the initial ramp for inserted coins. Master plate 101 includes two bearing lugs 109 and 110 which position a pivot shaft 73. Pivot shaft 73 provides a means for pivotally supporting each of three plates. The largest of the three plates is guide plate 70 which, as shown in FIG. 1, is superimposed on master plate 101, and is in spaced relation thereto to form an entry channel for the reception of deposited coins. This relation is also shown in FIGS. 3 and 4. On its right side guide plate 70 terminates in two arm members 81 and 82 which have integral bearing lugs 83 and 84, respectively, for mounting on pivot shaft 73. Superimposed on guide plate 70 is separator plate 80. Separator plate 80 also terminates on its right side in two arm members 78 and 79 which include integral bearing lugs 71 and 72, respectively. The primary function of separator plate 80 is to provide a mounting means for each of three coin-weight-testing cradles 802, 803, and 804 which are mounted for pivotal movement by fasteners 805, 806, and 807. Each of the coin cradles includes an upper cradle finger 808, 809, or 810, respectively, and a lower cradle finger 811, 812, or 813, respectively. Additionally, each of the coin cradles includes a respective one of the counterweights 814, 815, or 816.

Coin cradle fingers 808 through 813, as shown in FIG. 3, normally protrude into the coin channel which is formed between master plate 101 and guide plate 70. Protrusion of the fingers into this area through guide plate 70 is permitted by arcuate apertures, such as 77 and 73. Separator plate 80 also includes a plurality of substantially rectangular apertures 87, 88, 89, and 801 which have been cut to provide tabs 87A, 88A, 89A, and 801A, which are bent inwardly substantially perpendicular to the plane of separator plate 80. Tabs 87A and 88A limit the rotational movement of cradle 803 and tabs 88A and 801A mark the limiting points for the rotational movement of cradle 804. A similar tab 817 establishes the spacing between separator plate 80 and guide plate 70. One additional tab 85 on separator plate 80 limits the counterclockwise travel of cradle 802. The clockwise travel of cradle 802 is limited by lip member 822 which is integral with separator plate 80 but bent at right angles with the normal plane thereof. Lip 822, which protrudes through an aperture 76 in guide plate 70, also serves as a continuation of the entry ramp 10, shown in FIG. 4, which in turn is a part of the edge lip 101A of master plate 101. Separator plate 80, on its inner right edge, which extends between legs 81 and 82, also includes a protruding nickel deflector lip 820 which is bent inwardly, extending through aperture 97 in magnet plate 90 and through aperture 116, shown in FIG. 8, in master plate 101. Separator plate 80 and guide plate 70 are biased inwardly by the ends of spring 701 bearing against legs 81 and 82 of separator plate 80, which legs are in turn superimposed by extending flanges over legs 78 and 79 of guide plate 70.

Figures 8, 9:
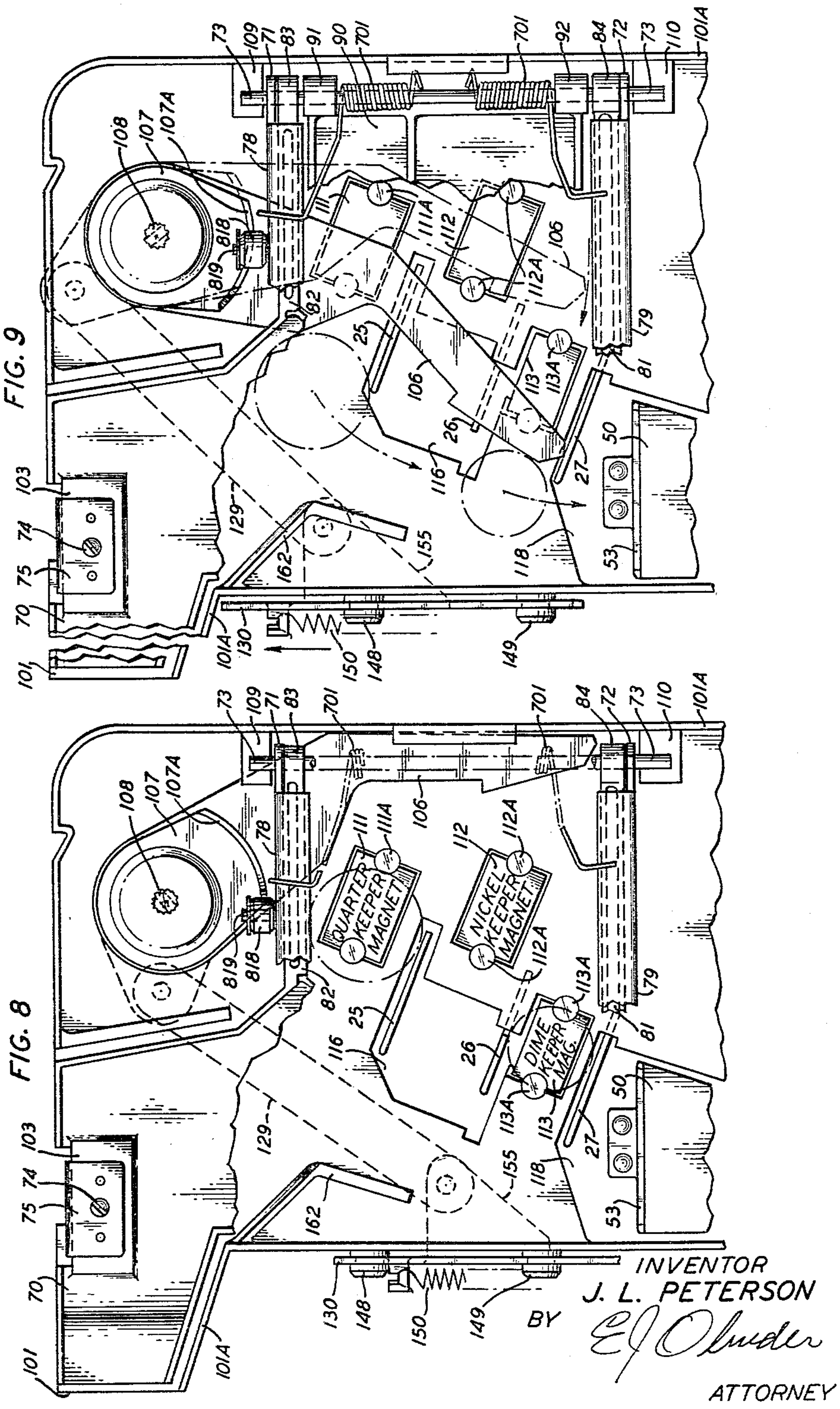
FIG. 8 is a partial right side view with the clear out mechanism in the unoperated condition.
FIG. 9 is a partial left side view in elevation with the clear out mechanism in the operated condition.

The third plate mounted on pivot shaft 73 is magnet plate 90, which occupies the space between legs 78 and 79 of guide plate 70 and legs 81 and 82 of separator plate 80. The function of magnet plate 90 is to provide a mounting means for the quarter eddy current magnet 93 and the dime eddy current magnet 94. Magnet plate 90 is superimposed on but in spaced relation to master plate 101. Quarter magnet 93 is positioned to be directly over, but in spaced relation to quarter keeper magnet 111 which, as shown in FIG. 8, is mounted in an aperture in master plate 101 by fasteners 111A. Similarly, dime magnet 93 is positioned to be directly over but in spaced relation to dime keeper magnet 113 which, as shown in FIG. 8, is mounted in an aperture in master plate 101 by fasteners 113A. Spacing between master plate 101 and magnet plate 90 is controlled by adjusting screw 96 which is mounted on arm 95 of magnet plate 90. The end of screw 96 in turn bears against quarter cover plate 40.

Superimposed on the lower portion of master plate 101 is quarter plate 30 and superimposed on quarter plate 30 is quarter cover plate 40. These plates are held in place and affixed to master plate 101 by fasteners 42, 43, 44, and 45. The right side of quarter plate 30, or the side away from master plate 101, includes a depressed quarter channel which is defined by raised boundary ridges 31 and 32. Ridge members 33 in the quarter channel provide low friction guiding surfaces for quarters directed into the channel.

Mounted on the upper edge of quarter plate 30 is a dime divider plate 35 pivotally mounted on pin 37. Pin 37 is in turn secured to mounting bracket 39, the position of which may be adjusted laterally through means of adjusting screw 302. Dime divider plate 35 includes finger members 304 and 305 which are bent inwardly above quarter plate 30 and through aperture 306, respectively, to extend between quarter plate 30 and master plate 101. The purpose of finger members 304 and 305 is to deflect dimes into the collect area or into the reject area in accordance with the fall trajectory of the dimes as they leave the eddy current test area. This operation is described in detail below in connection with the operational description.

Also mounted on quarter plate 30 is quarter divider plate 36 which is pivotally mounted on pin 38. Pin 38 is secured to adjusting bracket 301 which may be moved laterally through means of adjusting screw 303. Finger 307 which is integral with quarter divider plate 36 is bent inwardly toward master plate 101 and protrudes into the channel formed between quarter plate 30 and master plate 101. The function of finger 307 is to deflect falling quarters having the proper trajectory into the quarter channel defined by ridges 31 and 32. The details of this function are also explained below in connection with the operational description.

Figure 12:
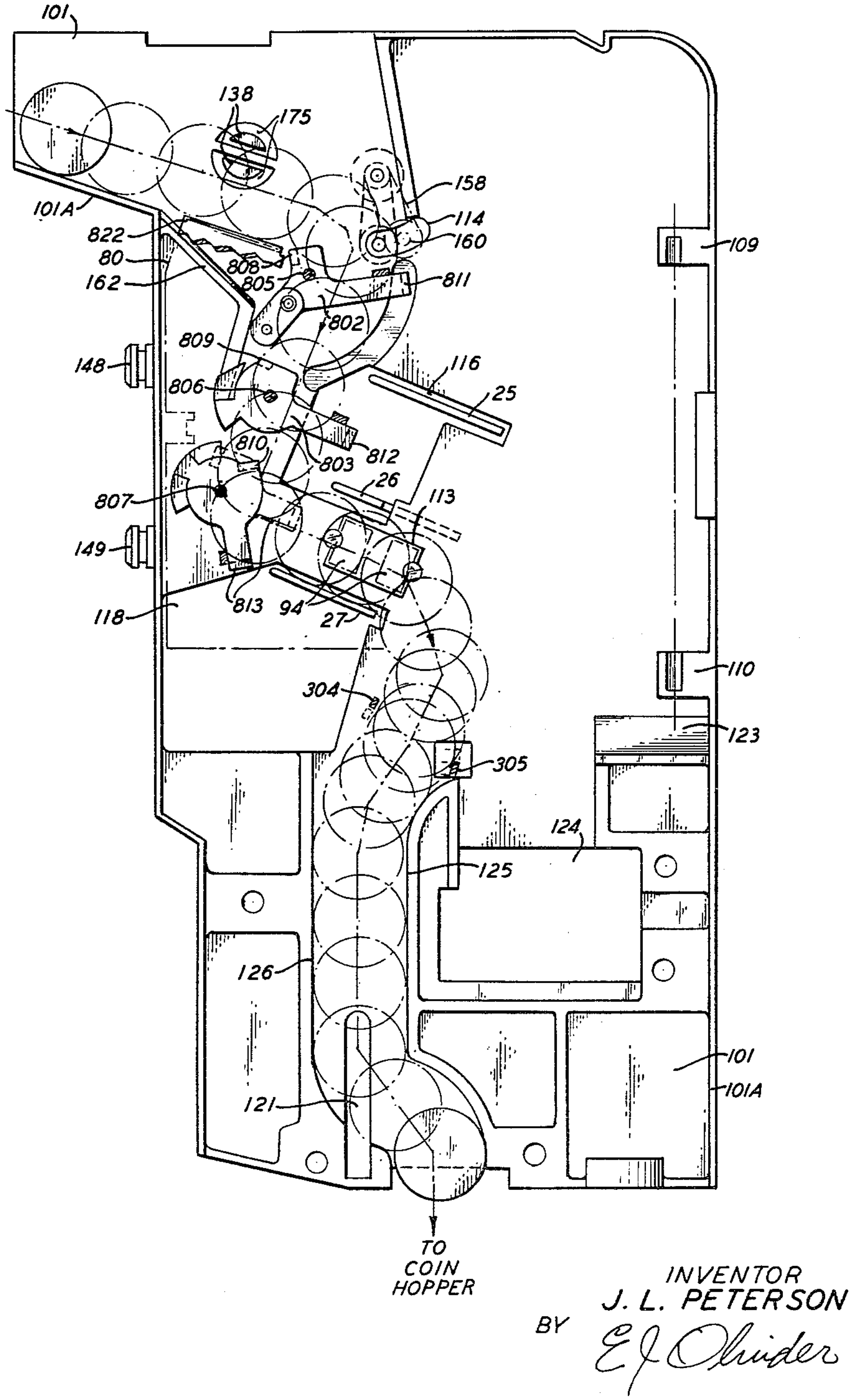
FIG. 12 is the same view as FIG. 11 showing the path of an accepted dime.

With reference now to FIG. 12, raised ridges 125 and 126 of master plate 101 define the limits of a dime channel. Additionally, these ridges provide a supporting surface for quarter plate 30. It is thus apparent that in the lower portion of their travel dimes are guided between master plate 101 and quarter plate 30 while quarters are guided between the opposite side of quarter plate 30 and quarter cover plate 40.

In its lower portion quarter cover plate 40 includes a longitudinal slot 121 which also extends through quarter plate 30, master plate 101, and nickel cover plate 60, as shown in FIG. 2. The purpose of slot 121 is to provide a means for inserting a mechanical finger or fingers into the drop path of each of the coins. Movement of such fingers may then be translated by suitable totalizer apparatus into information indicative of the value of deposited coins. An arrangement of this type is disclosed in U.S. Patent 3,144,115, issued to D. W. Peat and L. A. Strommen, August 11, 1964.

As shown in FIG. 2, a small reject magnet 138 is held in place next to master plate 101 by a mounting flap 143 which in turn is mounted for pivotal movement on pin 139. Pin 139 is supported by mounting lugs 140 and 141 which are integral with master plate 101. Mounting flap 143 includes a top lip member 142 which is in engaging relation with a flap 75. Flap 75 is curved over the top of master plate 101 and is secured to boss 103 on guide plate 70 by means of fastener 74. An aperture 175 in master plate 101, best seen in FIG. 10, permits magnet 138 to rest substantially flush with the surface of the right side of master plate 101.

Figure 10:
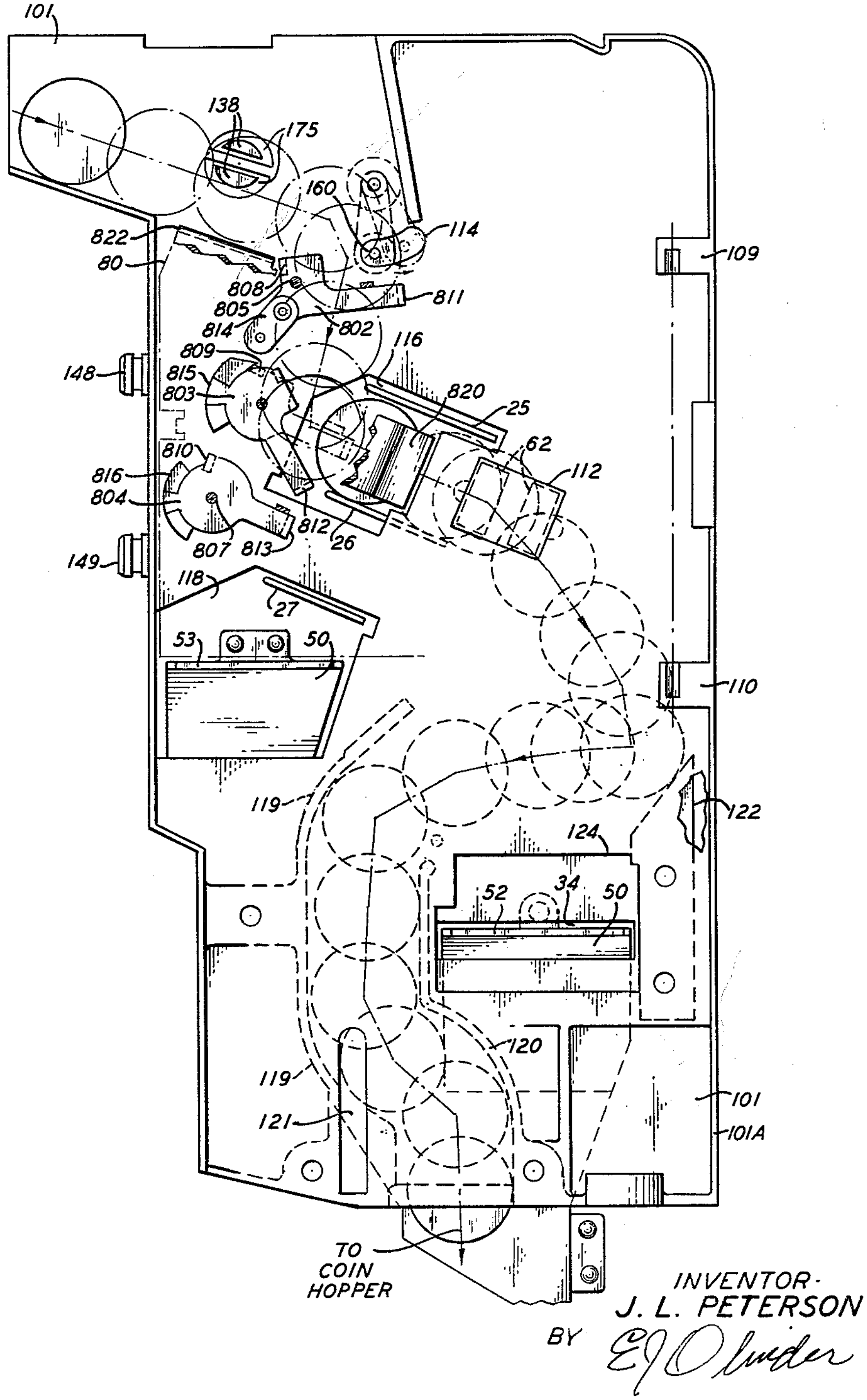
FIG. 10 is a left side view in elevation showing the path of an accepted nickel.

FIG. 2 also shows two plate members secured to the left side of master plate 101. The first plate, run plate 20, includes bearing lugs 21 and 22 which pivot on pin 159. Pin 159 is in turn supported by bearing lugs 135 and 136 of master plate 101. Run plate 20 is biased inwardly against master plate 101 by spring 23. Run plate 20 includes three ramps or runs 25, 26, and 27 which are perpendicularly disposed to the major surface thereof. Runs 25 and 26 protrude through apertures 116 in master plate 101 and run 27 protrudes through aperture 118 in master plate 101, as shown in FIG. 10, so that each of the runs 25, 26, and 27 extends into the channel formed between the right side of master plate 101 and magnet plate 90.

The second plate member on the left side of master plate 101 is nickel cover plate 60, the top part of which is under run plate 20. Nickel cover plate 60, which is affixed to master plate 101 by fasteners 63, 64, and 65, includes two slots 66 and 67 which permit runs 25 and 26 of run plate 20 to pass through to aperture 116 in master plate 101. A nickel eddy current magnet 62 is suitably affixed to nickel cover plate 60 and extends above the surface thereof through aperture 29. Nickel plate 60 bears against ridges 119 and 120 of master plate 101 forming thereby a channel for the guidance of nickels as they descend from the eddy current test area. As shown in FIG. 10, a nickel bounce anvil 122 is secured to master plate 101 in the same plane as the nickel channel formed by ridges 119 and 120.

Apparatus employed to clear out rejected coins which have been retained in the chute include a clear out actuating slide 130, best seen in FIG. 3. Clear out slide 130 is mounted on the front of master plate 101 by means of studs 148 and 149. Suitable force exerted on roller 145 by means of a customer actuated linkage, not shown, operates against clear out slide 130, moving it upwardly with respect to studs 148 and 149 and also with respect to master plate 101. This movement of slide 130 is limited by the configuration of slots 146 and 147 which ride against the shanks of studs 148 and 149, respectively. As shown in FIG. 2, a flap 155 of slide 130 is bent inwardly at right angles to the major portion of slide 130. Linkage 129 is secured to flap 155 by means of fastener 131 and by means of fastener 132 to a cam member 128. Cam member 128 includes cam surface 128A which is in actuating contact with cam follower 201 which is secured to run plate 20 by means of screw 202. Securing pin 108 which provides a means for pivoting cam 128 with respect to master plate 101 also serves as a pivot for clear out arm 127. Securing pin 108 extends through to the right side of master plate 101, as shown in FIG. 1, and provides an axis for a second clear out arm 106 and for a second cam 107. Cam 107 includes cam surface 107A which is in driving relation to cam follower 818 which in turn is mounted on separator plate 80 by means of an axis pin 819. Securing pin 108 locks clear out arms 127 and 106 and cams 128 and 107 together so that in effect these elements form a unitary structure. Details of the function of the clear out mechanism are described below as a part of the operational description.

In FIG. 2 a coin return chute 50 is shown which provides a means for directing coins which have been ejected from the coin chute proper to a coin refund receptacle (not shown) for eventual return to the customer. Coin return chute 50 which may be secured to the coin chute proper by any suitable means is a simple case-like structure which includes an upper open lip 53 which extends through aperture 118 in master plate 101 and through aperture 34 in quarter plate 30, thereby to intersect the coin channel between nickel cover plate 60 and master plate 101, the dime channel between master plate 101 and quarter plate 30, and the quarter channel between quarter plate 30 and quarter cover plate 40. Coin return chute 50 also includes a lower open lip 52 which extends through aperture 61 in nickel cover plate 60, through aperture 124, shown in FIG. 10, in master plate 101 and through aperture 34 in quarter plate 30. A single discharge path 51 is provided at the bottom of coin return chute 50.

*Operation*

Figure 14:
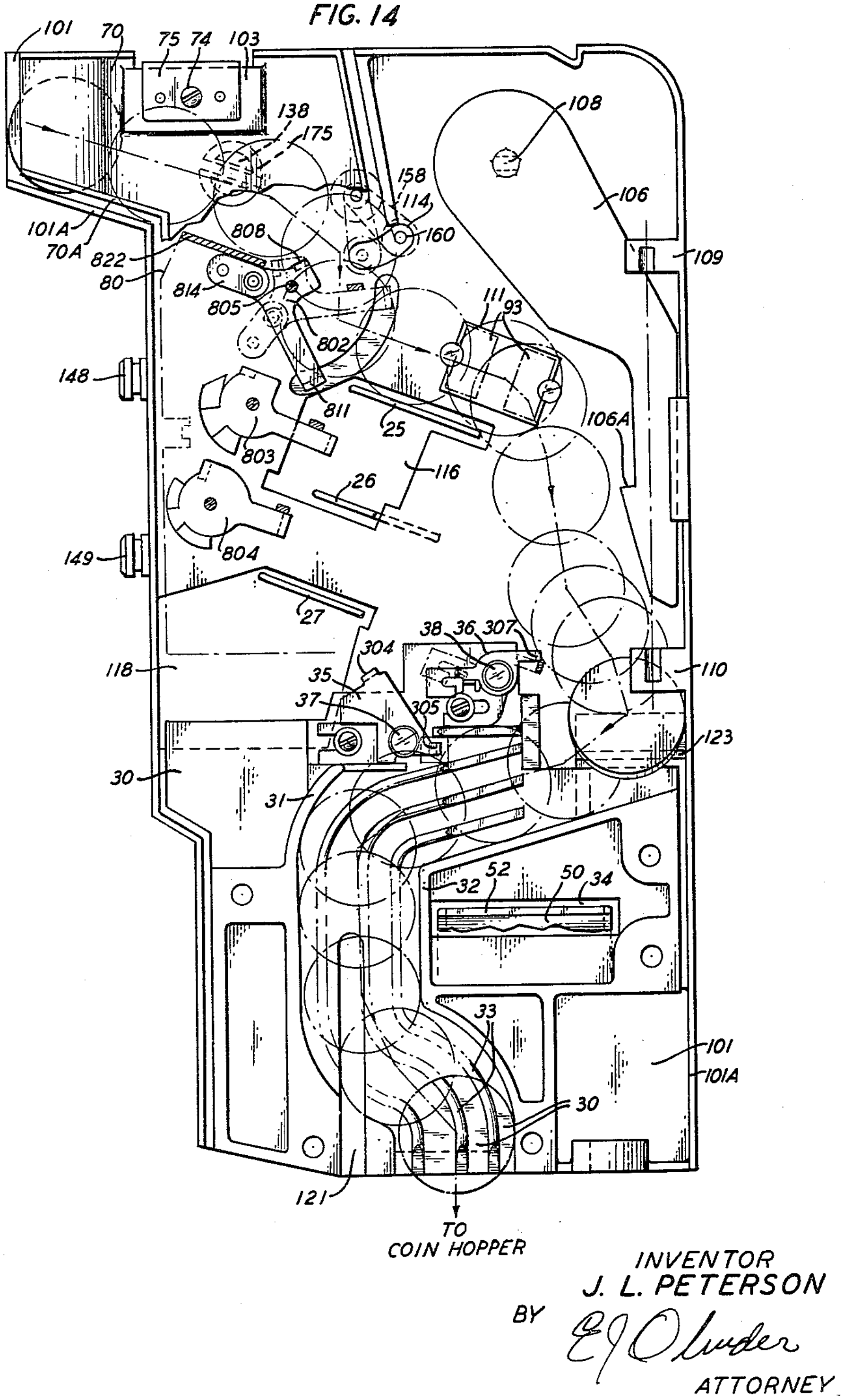
FIG. 14 is the same view as FIG. 13 showing the path of an accepted quarter.

A coin chute is typically enclosed in a housing, such as a telephone housing, for example. The housing may be provided with a coin entrance slot which gauges all deposits to ensure that each is smaller in diameter than a maximum diameter quarter and that the thickness of each is less than that of a maximum thickness nickel. All deposits passing through the coin entrance slot (not shown) enter the channel formed by guide plate 70 and master plate 101. Taking as a first example the deposit of a quarter, which is illustrated in FIG. 14, the coin rolls down the ramp formed by lip 101A of master plate 101 and lip 822 of separator plate 80. Assuming that the quarter is nonmagnetic, the coin passes through the field of reject magnet 138. The progress of the quarter is impeded by striking damper pin 160 which is swung to the rear of the coin chute. The coin is thereby diverted downwardly to rest between fingers 808 and 811 of quarter cradle 802. If the coin is of sufficient diameter and lighter than a predetermined weight it is caught and held by fingers 808 and 811. If, however, the coin exceeds that predetermined weight, quarter cradle 802 will rotate clockwise to the point at which counterweight 814 is stopped by lip 822 and the quarter is rolled off onto coin run 25. At this point the passageway for the coin is formed between master plate 101 and magnet plate 90. The coin then passes between quarter magnet 93, shown in FIG. 1, and quarter keeper magnet 111 which together with magnet 93 forms a complete magnetic circuit.

Materials passing through a magnetic field experience a force which opposes their motion due to eddy currents induced in the material. This force varies according to the velocity at which the material enters the magnetic field, the strength of the field, and the resistivity of the material. Since the strength of the magnetic field is constant, the force becomes only a function of the velocity and resistivity. As each deposit starts from a stop position when it leaves the rotated coin cradle, the velocity of each deposit as it enters the magnetic field varies as its density.

A quarter with the proper resistivity-density product attains a velocity which results in the trajectory shown in FIG. 14. Near the bottom of this trajectory the quarter strikes extending finger 307 of quarter divider plate 36 which then pivots on pin 33. The quarter is thus deflected to impinge upon a raised bevelled strike plate 123 which is integral with master plate 101. Strike plate 123 in turn deflects the quarter into the channel which is bounded by quarter plate 30, by raised quarter plate ridges 31 and 32 and by superimposed quarter cover plate 40. The quarter leaves the coin chute at the bottom enroute to a coin hopper (not shown) or other coin collecting receptacle.

Figure 15:
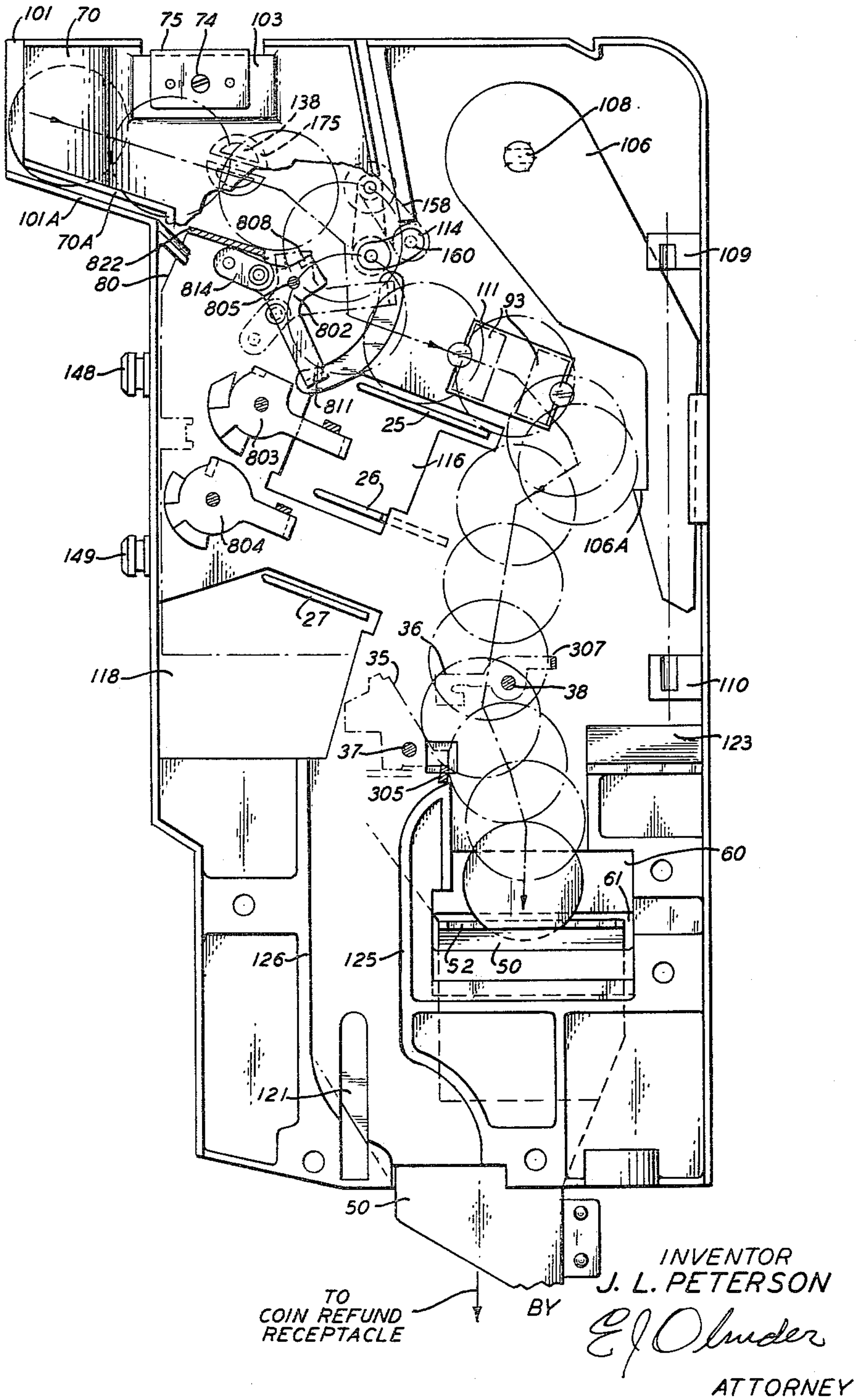
FIG. 15 is the same view as FIG. 14 showing the path of a rejected quarter.

The path of a quarter which fails to pass the eddy current magnet test because of two low a density-resistivity product and hence too high a velocity is shown in FIG. 15. The path of the coin shown in FIG. 15 is identical to that shown in FIG. 14 up to the point at which the coin leaves the eddy current test area. As shown in FIG. 15, excess velocity causes the coin to strike the point 106A of sweep arm 106 and the coin is deflected to the left. In its downward travel the coin strikes finger 307 of quarter dividing plate 36 on the left rather than on the right side and accordingly the coin fails to strike deflecting plate 123 and instead drops down into receiving lip 52 of coin return chute 50. It is evident that if the velocity of the coin as it leaves the eddy current test area is too low rather than too high, the coin would drop in a fairly straight path into the open lip 52 of coin return chute 50.

The case of a dime deposit is illustrated in FIG. 12. In its initial travel a dime moves over the same path described above for a quarter. The smaller size of the dime, however, permits it to drop through fingers 808 and 811 of quarter cradle 802 and through fingers 809 and 812 of nickel cradle 803. If the coin exceeds the diameter of a minimum sized dime, it comes to rest between fingers 810 and 813 of dime cradle 804. Assuming that the dime is of sufficient weight, dime cradle 804 rotates on pin 807, dropping the coin on coin run 27. Maximum permissible dime diameter is controlled by the distance between coin runs 26 and 27. At this point the coin is between dime keeper magnet 113 and dime eddy current magnet 94.

A coin with the proper density-resistivity product leaves the eddy current test area with a velocity which produces the trajectory shown in FIG. 12. Toward the end of its trajectory the dime strikes finger 305 of dime divider plate 35 and passes between dime divider plate fingers 304 and 305, thereby being guided into the dime channel formed by raised ridges 125 and 126 of master plate 101 and the reverse side of quarter plate 30.

Figure 13:
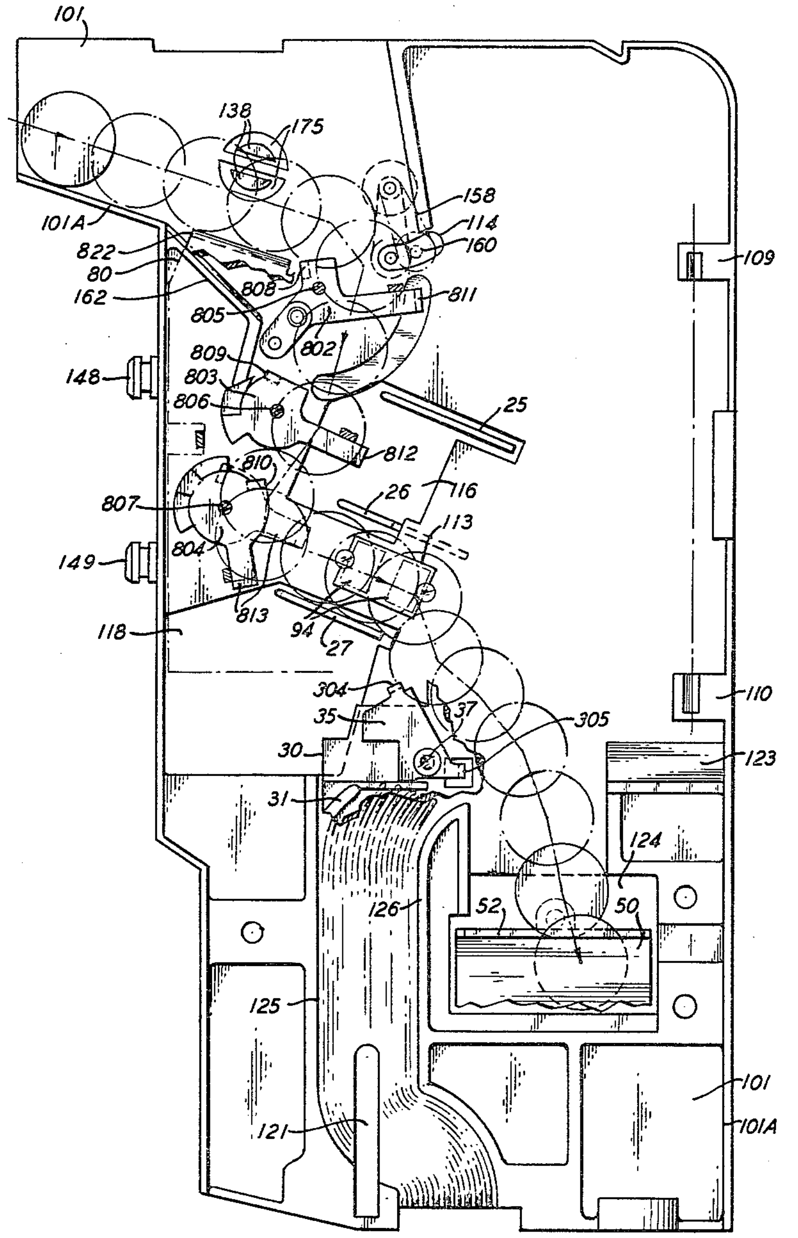
FIG. 13 is the same view as FIG. 12 showing the path of a rejected dime.

The path of a dime which leaves the eddy current test area with a velocity that is below the prescribed minimum is shown in FIG. 13. In such a case, as indicated, the velocity of the dime is insufficient to permit its trajectory to clear upper finger 304 of dime divider plate 35 and as a result the coin strikes finger 304 and is deflected clear of lower finger 305. Consequently, the coin falls directly into open lip 52 of coin return hopper 50. It is evident that in the event of a coin velocity that is too high the trajectory of the coin as it leaves the eddy current test area would carry it clear of fingers 304 and 305 and it would fall directly once again into open lip 52 of coin return hopper 50.

The path of a genuine nickel is illustrated in FIG. 10. After striking damper pin 160, the coin is deflected downwardly through the space between fingers 808 and 811 of quarter cradle 802 from whence it drops downwardly against fingers 809 and 812 of nickel cradle 803. If the nickel is of sufficient weight, nickel cradle 803 rotates, dropping the coin on coin run 26. Maximum nickel diameter is limited by the spacing between coin runs 25 and 26.

Figure 6:
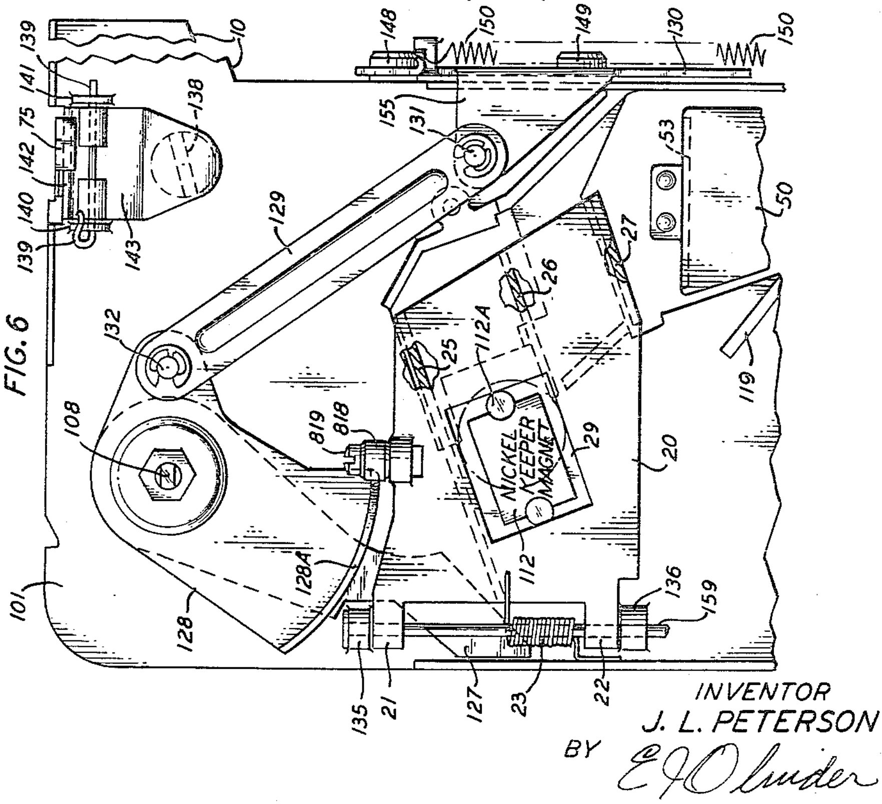
FIG. 6 is a partial left side view in elevation with the nickel cover plate removed and the chute in the unoperated condition.
Figure 11:
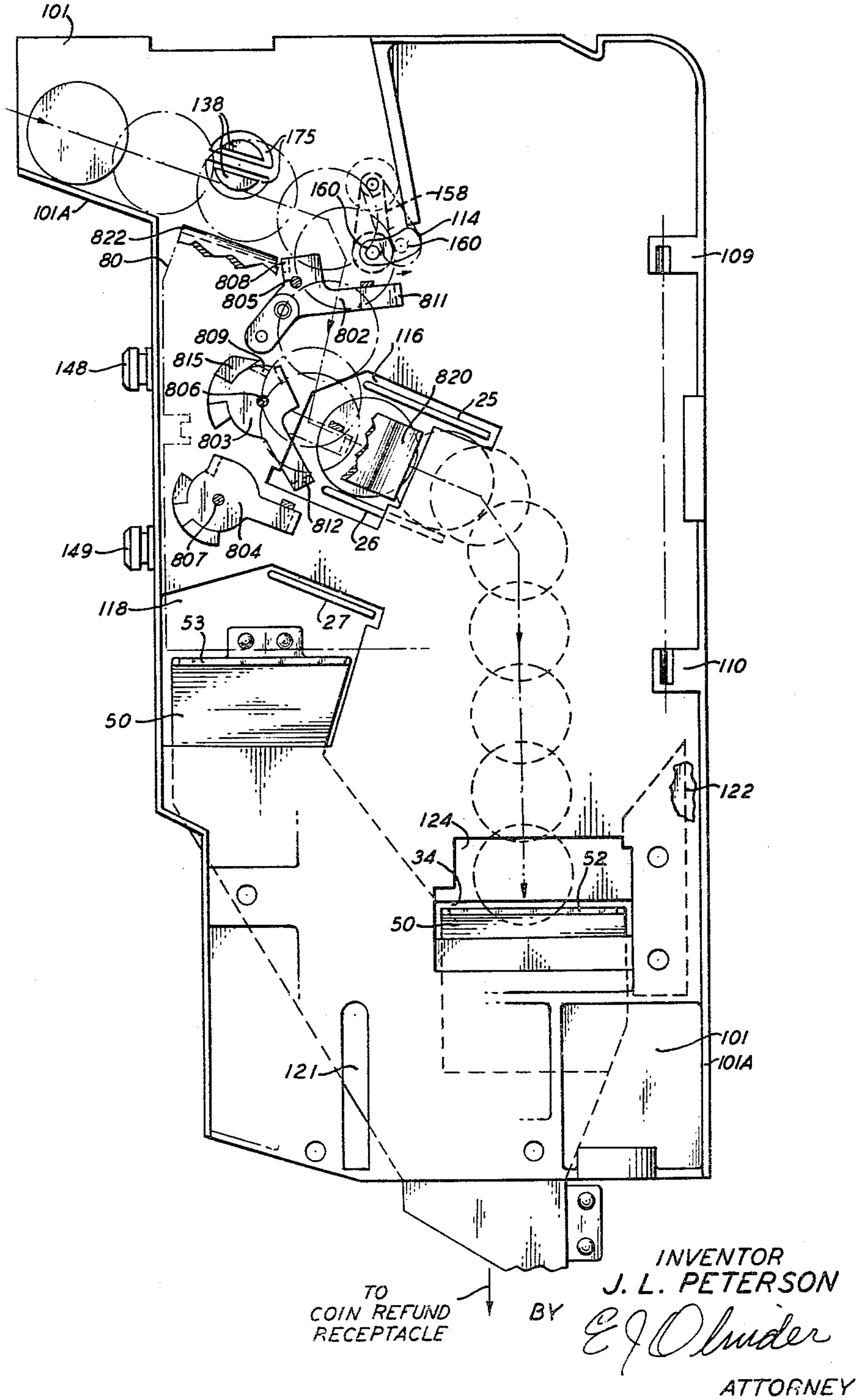
FIG. 11 is the same view as FIG. 10 showing the path of a rejected nickel.

At the start of its travel on run 126 the coin strikes nickel deflecting lip 820 of separator plate 80 and is guided through aperture 116 in master plate 101 to the channel on the left side of master plate 101 which is between nickel cover plate 60 and master plate 101. The nickel continues to roll down coin run 26 as it passes between nickel magnet 62 and nickel keeper magnet 112. A nickel with the proper density-resistivity product has a velocity upon leaving the eddy current test area which results in the trajectory shown in FIG. 10. Toward the end of this trajectory the nickel strikes nickel bounce anvil 122. A nickel has a greater trajectory than most common materials except lead due to its high resistivity-density product. Because of this trajectory it is possible to place bounce anvil 122 beyond the reach of most nickel-size slugs and bounce nickels back across the reject area into the nickel channel which is bounded by raised ridges 119 and 120 of master plate 101. A deposit such as a nickel-size lead slug has insufficient bounce velocity after striking the anvil and is accordingly deflected from the anvil directly into open lip 52 of coin return chute 50. The path of a nickel size deposit which fails to pass the eddy current test is illustrated in FIG. 11. Clear out action is initiated by the operation of a suitable customer operated lever and linkage (not shown) which imparts upward force to roller 145, shown in FIG. 3. Clear out slide 130 is driven upwardly and through linkage 129 causes the combination of cam 128, cam 107, clear out arm 127 and clear out arm 106 to rotate as a single unit. Cam 128, as shown in FIG. 6, in pivoting in a counterclockwise direction, causes cam surface 128A to ride against roller 818. As a result, run plate 20 is pivoted on pin 24 outwardly away from master plate 101 and runs 25, 26, and 27 are withdrawn from all of the coin channels. In a similar fashion, on the opposite side of master plate 101, as shown in FIG. 8, cam surface 107A rides against roller 818 which pivots separator plate 80 on pivot pin 73 away from master plate 101, causing coin cradles 802, 803, and 804 to be withdrawn from all of the coin channels.

As separator plate 80 is pivoted outwardly, an integral lip 827, shown in FIGS. 4 and 5, engages a recessed shoulder 701 of guide plate 70 and causes guide plate 70 to pivot outwardly on pivot pin 73 away from master plate 101. The entire coin channel between master plate 101 and guide plate 70 is thereby enlarged and coins which have been stuck or held in this area are free to drop into open lips 52 or 53 of coin return chute 50.

As guide plate 70 is pivoted outwardly, as described above, flap 75, as shown in FIGS. 6 and 7, engages lip 142 causing reject magnet mounting flap 143 to swing outwardly away from master plate 101 as it pivots on pin 139. Accordingly, reject magnet 138 is withdrawn from aperture 175 in master plate 101 and any coin which has been held in that area by reject magnet 138 is released to drop into coin return chute 50.

Figure 7:
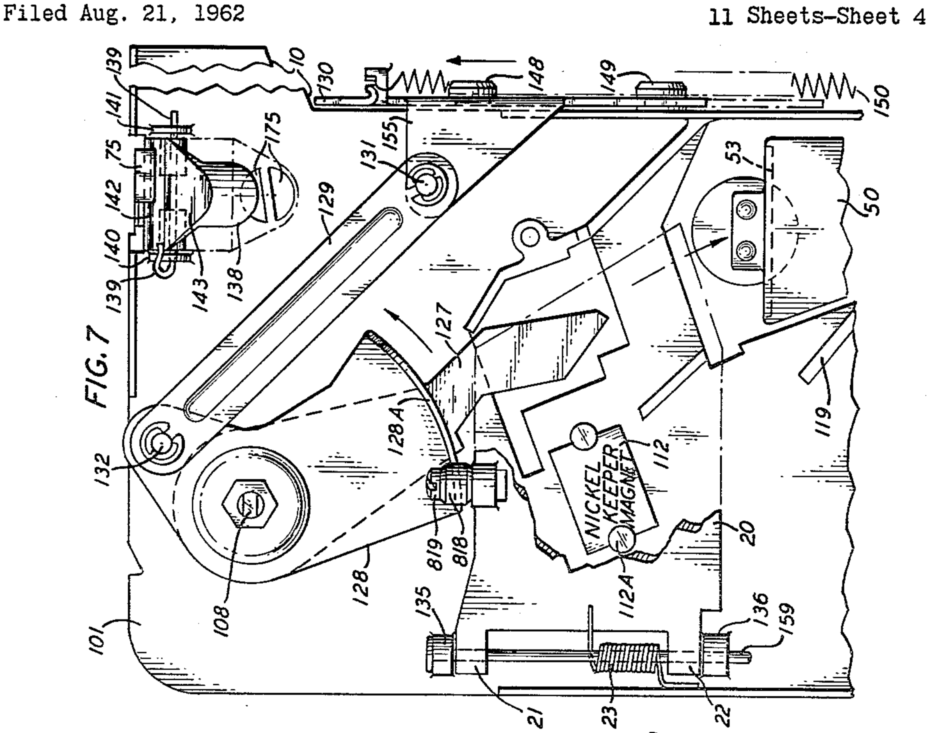
FIG. 7 is the same view as FIG. 6 with the clear out mechanism in the operated condition.

During the action described above, nickel clear out arm 127, as shown in FIG. 6, sweeps to the right across the eddy current test area to the position shown in FIG. 7. As a result, any coins which have been held in the eddy current test area are swept clear and fall freely into open lip 53 of coin return chute 50. Similarly, quarter and dime clear out arm 106, as shown in FIG. 8, swings to the left across the eddy current test area to a position which is illustrated in FIG. 9. Any coins which have been retained in the eddy current test area are accordingly swept clear and drop into open lip 53 of coin return chute 50.

During the clear out operation described, the free fall of all released coins is ensured as a result of the increased spacing between master plate 101 and guide plate 70, shown in FIG. 4, and also as a result of the withdrawal of coin runs 25, 26, and 27 and the withdrawal of coin cradles 802, 803, and 804 from all of the coin channels. When upward force on roller 145, shown in FIG. 3, is released, tension on spring 150 pulls clear out slide 130 downwardly until it returns to its unoperated or rest position.

It is to be understood that the embodiment described herein is merely illustrative of the principles of the invention. A wide variety of modifications may be devised by persons skilled in the art without departing from the spirit and scope of the invention.

What is claimed is:

1. A coin chute for receiving and testing coins deposited in coin operated apparatus comprising, in combination, a plurality of superimposed plate members defining coin channels for directing the travel of deposited coins through said chute, said plate members including a relatively fixed plate member having an aperture therein and mounting means thereon for securing the others of said plate members thereto, a second plate member pivotally mounted on said fixed plate, one side of said second plate and one side of said fixed plate defining a first channel for the deposit of all coins, a third plate member pivotally mounted on said fixed plate including means for applying an eddy current test to dimes and quarters as said dimes and quarters are guided between a second channel between said fixed plate and said third plate, means for deflecting nickels through said aperture from said one side of said fixed plate to the opposite side of said fixed plate, and a fourth plate member affixed to said opposite side of said fixed plate thereby to form a third channel for nickels operative after the deflection of said nickels by said deflecting means, said fourth plate including means for applying an eddy current test to nickels in said third channel, whereby said chute may readily be converted for receiving both magnetic and nonmagnetic nickels by the removal of said last named eddy current test means.

2. Apparatus in accordance with claim 1 including a fifth plate member pivotally mounted on said one side of said fixed plate and having combination coin weight and size testing means mounted thereon protruding into said first channel, said deflecting means comprising a protruding lip member integral with said fifth plate and extending through said aperture.

3. Apparatus in accordance with claim 2 including a sixth plate member pivotally mounted on said opposite side of said fixed plate, said sixth plate having a plurality of coin run members integral therewith each extending into said second channel and into said third channel.

4. Apparatus in accordance with claim 3 including multifunction means for withdrawing said coin-weight-testing means from said first channel and for withdrawing said coin runs from said second and third channels.

5. Apparatus for receiving and testing coins deposited in coin operated equipment comprising, in combination, a relatively fixed plate member having an aperture therein and mounting means thereon for securing other plate members thereto, said other plate members including a second plate pivotally mounted on one side of said fixed plate and defining therewith a first channel for the deposit of all coins, a third plate member pivotally mounted on said one side of said fixed plate and defining therewith a second coin channel, said third plate including means mounted thereon for applying an eddy current test to dimes and quarters, a fourth plate member pivotally mounted on said one side of said fixed plate having coin-weight-testing cradles mounted thereon, said cradles being positioned thereby in said first channel, a fifth plate member pivotally mounted on the opposite side of said fixed plate and having run means thereon extending into said second channel thereby providing supporting tracks for the guidance of quarters and dimes in said second channel during the operation of said eddy current test means, a sixth plate member fixedly mounted on said opposite side of said fixed plate and forming therewith a third coin channel for nickels, said sixth plate including means for applying an eddy current test to nickels, means for diverting nickels from said first coin channel to said third coin channel after said nickels have been tested by one of said cradles, said run means extending into said third coin channel thereby providing guidance for nickels in said third channel during the operation of said nickel eddy current test means, and combined coin clear out means for withdrawing said runs from said second and third channels for withdrawing said cradles from said first channel, for widening said first channel and for sweeping out said first, second and third channels.

6. Apparatus in accordance with claim 5 wherein said clear out means comprises first means for pivoting said fourth plate away from said fixed plate, second means for pivoting said fifth plate away from said fixed plate, third means responsive to the pivoting of said fourth plate for pivoting said second plate away from said fixed plate, a first clear out arm for sweeping across said opposite side of said fixed plate, a second clear out arm for sweeping across said one side of said fixed plate, and manually controllable means for operating said first, second and third means and said first and second clear out arms.

7. Apparatus in accordance with claim 6 wherein said first means includes a first cam rotatable mounted on said one side of said fixed plate, a first cam follower mounted on said fourth plate in cooperative relation with said first cam, a second cam rotatably mounted on said opposite side of said fixed plate, a second cam follower mounted on said fifth plate in cooperative relation with said second cam, said first cam, said second cam, said first arm and said second arm being rigidly mounted on a common axis and forming thereby a unitary assembly rotatably responsive to said operating means.

8. A coin chute for receiving and testing coins deposited in coin operated apparatus comprising, in combination, means forming a first channel in a first plane for the deposit of all coins, first mounting means supporting combination coin size and weight testing means in said first channel, means forming a second channel in said first plane, means forming a third channel in a second plane substantially parallel to but in spaced relation to said first and second channels, said second channel forming means including means for applying an eddy current test to quarters and a means for applying an eddy current test to dimes, said third channel forming means including means for applying an eddy current test to nickels, means protruding into said second and third channels providing separate and distinct coin runs for guiding each coin denomination during the application of its respective eddy current test, means for deflecting nickels from said first channel to said third channel after said nickels have been tested by said weight testing means whereby said nickels are then guided to said nickel eddy current test means by a part of said coin run means, and combination means for withdrawing said weight testing means from said first channel, for withdrawing said coin run means from said second and third channels, for enlarging said first channel and for mechanically sweeping out said second and third channels of all coins lodged therein.

9. Apparatus in accordance with claim 8 wherein said combination means includes a unitary structure comprising first and second cams for withdrawing, respectively, said weight testing means and said coin run means and first and second sweep arms for sweeping out, respectively, said second and third channels, said combination means further including a manually operable linkage for imparting rotary movement to said unitary structure.

10. A coin operated apparatus coin chute comprising, in combination, means forming a first coin channel in a first plane for the deposit of nickels, dimes and quarters, means forming a second coin channel in said first plane for the guidance of dimes and quarters only, first, second and third means disposed in said first channel for weight-testing nickels, dimes and quarters, respectively, means for applying an eddy current test to quarters and dimes in said second channel, means forming a third coin channel for nickels only in a second plane substantially parallel to but in spaced relation to said first plane, means for applying an eddy current test to nickels in said third channel, and means for diverting each nickel deposited in said first channel from said first to said third channel immediately after the operation of said first weight testing means, whereby said eddy current test applying means for quarters and dimes is fully separate, distinct and physically removed from said eddy current test applying means for nickels, thereby facilitating a modification of said chute to enable the handling of both magnetic and nonmagnetic nickels.

11. A coin chute for receiving and testing coins deposited in coin operated apparatus comprising, in combination, a first plate member, a second plate member pivotally mounted on one side of said first plate and defining therebetween a first coin channel for the deposit of nickels, dimes and quarters, a third plate member pivotally mounted on said one side of said first plate and positioning in said first channel each of three coin weight and size testing coin cradles for quarters, nickels and dimes, respectively, a fourth plate member pivotally mounted on said one side of said first plate and forming therebetween a second coin channel for the guidance of quarters and dimes only, said fourth plate including eddy current test means for quarters and eddy current test means for dimes, a fifth plate member fixedly mounted on the opposite side of said first plate and defining therewith a third coin channel for nickels only, said fifth plate including eddy current test means for nickels, a sixth plate pivotally mounted on said opposite side of said first plate including coin run members extending into said second and third channels thereby providing means for guiding each coin denomination into position for the application of its respective eddy current test, means including a deflector lip integral with said third plate for deflecting nickels from said first channel to said third channel, a seventh plate fixedly mounted on said one side of said first plate below said second, third and fourth plates and defining therebetween a fourth channel for dimes only, an eighth plate fixedly mounted on and superimposed over said seventh plate and defining therebetween a fifth channel for quarters only immediately adjacent to and in a plane parallel with the plane of said fourth channel, a sixth channel for nickels only defined by said first and fifth plates, said sixth channel being parallel to but in spaced relation to said fourth and fifth channels, coin return chute means for directing rejected coins for customer refund, and means operative after the application of said eddy current tests for directing genuine quarters, dimes and nickels into said fifth, fourth and sixth channels, respectively, and for directing all spurious coins into said coin return chute.

12. Apparatus in accordance with claim 11 including coin clear out means comprising a first cam and a quarter-dime clear out arm rotatably mounted on said one side of said first plate, a second cam and a nickel clear out arm rotatably mounted on said opposite side of said first plate, a first cam follower mounted on said third plate in cooperative relation with said first cam, a second cam follower mounted on said sixth plate in cooperative relation with said second cam, said cams and said arms being fixedly mounted on a common axis for rotation as a unitary assembly, manually operable means for rotating said assembly, whereby, responsive to the operation of said rotating means, said third and sixth plates are pivoted outwardly away from said first plate withdrawing said coin runs and said cradles from said coin channels, and means responsive to the pivotal movement of said third plate for pivoting said second plate away from said first plate thereby to expand said first channel to release any coins lodged therein.

References Cited in the file of this patent

UNITED STATES PATENTS

| | | |
|---|---|---|
| 2,565,177 | Hokanson | Aug. 21, 1951 |
| 2,588,510 | Foushee et al. | Mar. 11, 1952 |
| 2,827,996 | Haverstick | Mar. 25, 1958 |